United States Patent
Henry-Baudot

[15] 3,686,521
[45] Aug. 22, 1972

[54] MAGNETIC MOTORS

[72] Inventor: Jacques Henry-Baudot, Antony, France

[73] Assignee: Kollmorgen Corporation, Holyoke, Mass.

[22] Filed: April 7, 1971

[21] Appl. No.: 131,864

[30] Foreign Application Priority Data

April 8, 1970 France.................70126/73

[52] U.S. Cl..................................310/46, 310/268
[51] Int. Cl.............................................H02k 23/54
[58] Field of Search..........310/266, 46, 268, 177, 40

[56] References Cited

UNITED STATES PATENTS 3,348,086 10/1967 Monma.....................310/268
3,096,455 7/1963 Hahn..........................310/268

Primary Examiner—D. F. Duggan
Attorney—Kemon, Palmer & Estabrook

[57] ABSTRACT

An electromagnetic motor operating from relative attractions and repulsions between inductor poles and winding coils of a commutator supplied armature, having $2p$ inductor poles on one face of an airgap, $p$ being a number higher than one, $2n$ winding coils, $n$ being a number higher than $p$ though not being a multiple of $p$, and $2n$ commutator blades.

8 Claims, 10 Drawing Figures

Patented Aug. 22, 1972

INVENTOR
JACQUES HENRY-BAUDOT

Kenyon, Palmer & Estabrook

ATTORNEYS

FIG_4
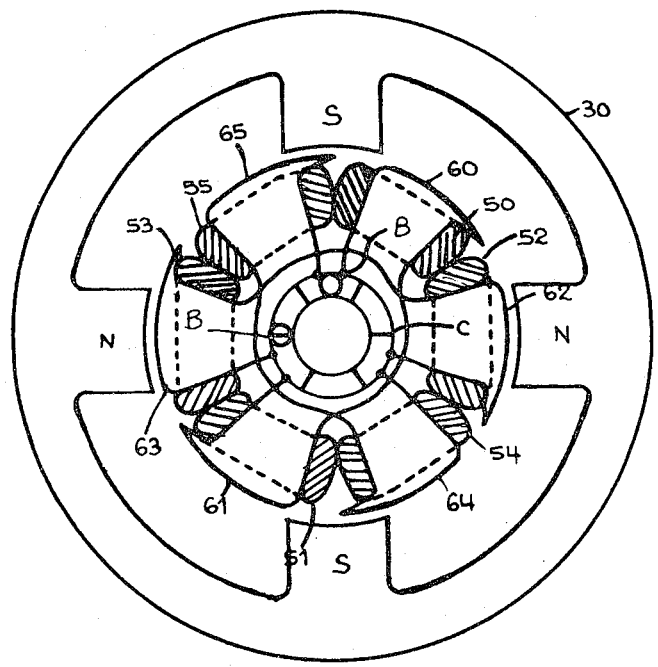
FIG_5
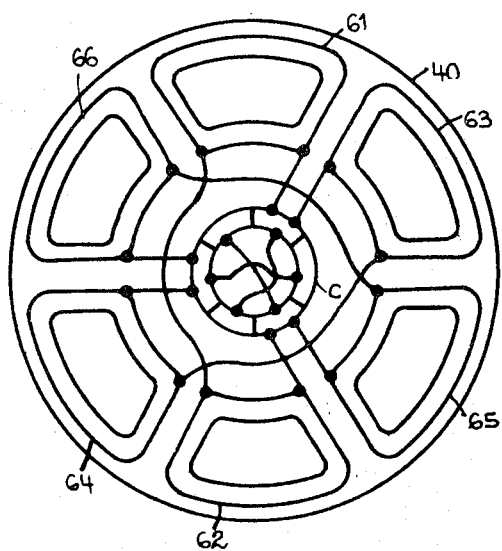
FIG_6
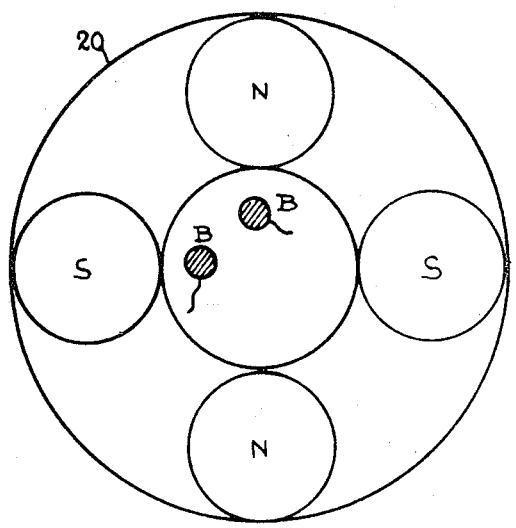
FIG_7
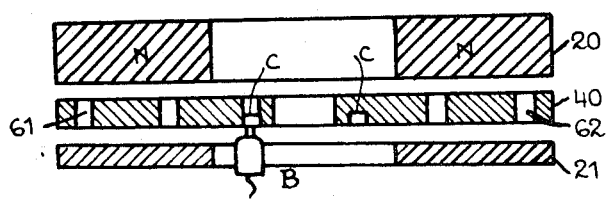
INVENTOR
JACQUES HENRY-BAUDOT
ATTORNEYS Patented Aug. 22, 1972

INVENTOR
Jacques Henry Baudot

ATTORNEY.

MAGNETIC MOTORS

SUMMARY OF THE INVENTION

The present invention concerns improvements in or relating to electromagnetic motors operating from relative attractions and repulsions between the inductor poles, either made of permanent magnets or made of electro-magnets, of a field structure, and the poles, each of which made of a winding coil of an electro-magnet, of an armature to which is mechanically united a commutator on the blades of which are applied brushes adapted to translate a D.C. or rectified electrical current to the said winding coils so that the motor torque is produced by the varied attractions and repulsions occurring between the inductor poles and the armature coils when the latter move with respect to the inductor poles. When for instance a North pole of the armature is attracted by a South pole of the field structure, the magnetic reluctance decreases until the two poles are in registering relation from face to face of the airgap and the commutator then reverses the magnetic polarity of the armature pole, which becomes a South pole and is then repelled by the South pole of the field structure; and so on, provided the relative distribution of the poles and the commutator blades ensures a permanent rotation of the armature without any dead points therein. The magnetic reluctance between the field structure and the armature and the electrical current through the brushes are consequently periodically varying and actually modulated at the frequency of the relative displacement of the armature poles under the inductor poles and of the commutation of the brushes on the commutator blades, and it is the "D.C." component of the product (electrical current $x$ magnetic flux) which generates the motor torque.

Electromagnetic motors of such a kind are generally made of a small size and with a two-pole field structure, the number of the rotating armature then being odd. Their efficiency is generally rather poor.

An object of the invention is to provide improved structures of such electromagnetic motors which are of a substantially improved electromagnetic efficiency in that they operate as if they were made of several two-field pole motors symmetrically contributing to the production of the motor torque exerted on the shaft of the motor armature.

According to a feature of the invention, an electromagnetic motor of the concerned kind comprises $2p$ inductor poles ($p$ higher than one) in its field structure and on one side of its airgap, $2n$ electro-magnet winding coils ($n$ higher than $p$ though not a multiple thereof) in its armature and $2n$ commutator blades in its commutator mechanically linked to its shaft and armature.

BRIEF DESCRIPTION OF THE DRAWINGS

Detail of the various advantages and features of the invention will be given in the following description with reference to the attached drawings wherein:

FIG. 4 shows an example of embodiment of the invention for a cylindrical airgap motor;

FIGS. 5 to 7, to be considered together, illustrate a possible embodiment of the invention for a planar airgap motor;

DETAILED DESCRIPTION

Figure 1:
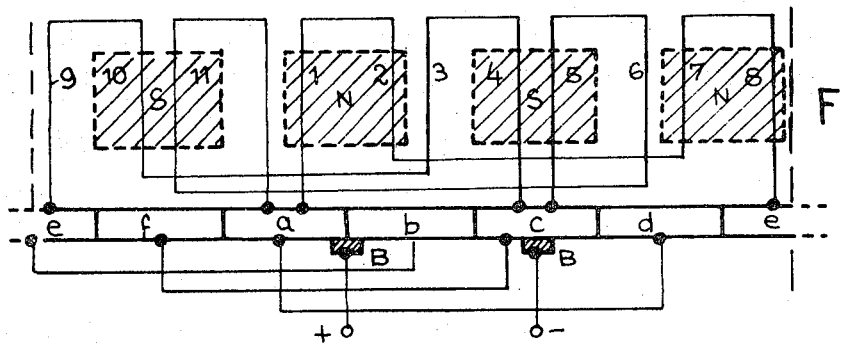
FIGS. 1 to 3 respectively show three schemes of possible embodiments of the invention, each in a planar developped view.

The electromagnetic motor the planar development of which is shown in FIG. 1 comprises two pairs of inductor field poles and three pairs of armature winding coils plus a commutator having six blades, from $a$ to $f$, the blade $a$ being electrically connected to the blade $d$, the blade $b$ being electrically connected to the blade $e$ and the blade $c$ being electrically connected to the blade $f$. One pair of brushes B is provided with its brushes spaced apart by one polar pitch and applied on the commutator blades which are connected as follows to the armature winding: a first pair of winding coils 1-2 and 7-8 interconnects the blades $b$ and $f$, said coils being spaced apart by a double polar pitch and being each merely represented as a single turn per coil for the sake of clarification; each winding cool further is shown as substantially spanning over about two-third of a polar pitch. A second pair of coils 3-4 and 9-10 is similarly formed and shown and connects the commutator blades $d$ and $f$. A third pair of coils 5-6 and 11-12 is also similarly formed and shown and connects the commutator clades $b$ and $d$.

Figure 2:
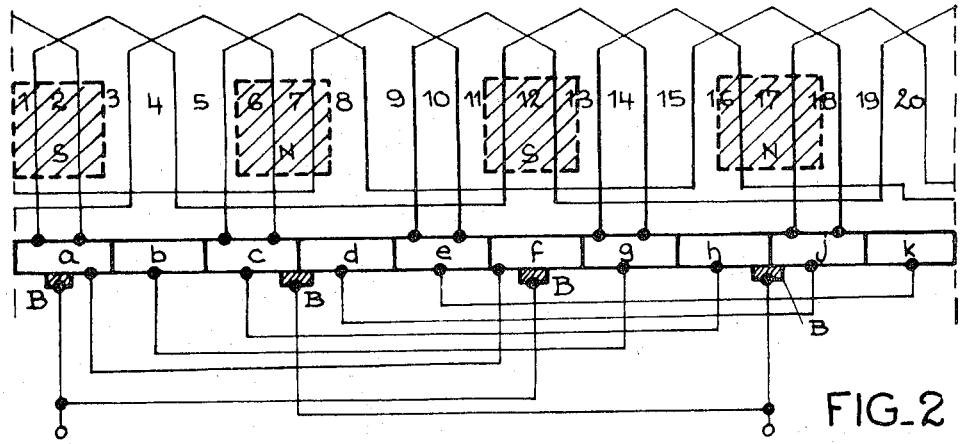

The electromagnetic motor shown in FIG. 2 comprises two pairs of inductor field poles and five pairs of armature winding coils plus a ten blade commutator, the blades of which are denoted $a$, $b$, $c$, $d$, $e$, $f$, $g$, $h$ and $k$. Each winding coil substantially spans over one polar pitch and is substantially spaced by two polar pitches from the other coil in each pair. As shown in the drawing, the coils may partially overlap. Each coil is only shown with two turns for the sake of simplicity. The first pair of winding coils 1-4 and 11-14 connects the commutator blades $a$ and $g$; the second pair of winding coils 5-8 and 15-18 connects the commutator blades $c$ and $j$; the third pair of winding coils 9-12 and 19-2 connects the commutator blades $e$ and $a$; the fourth pair of coils 13-16 and 3-6 connects the commutator blades $g$ and $c$; the fifth pair of coils 17-20 and 7-10 connects the commutator blades $j$ and $e$. Les blades $a$ and $f$ are connected together, so are the blades $b$ and $g$, the blades $c$ and $h$, the blades $d$ and $j$ and the blades $e$ and $k$. Two pairs of brushes B are associated to the commutator, the successive brushes being spaced apart by one polar pitch and the pairs of brushes being interleaved with respect to the supply terminals of the armature.

Figure 3:
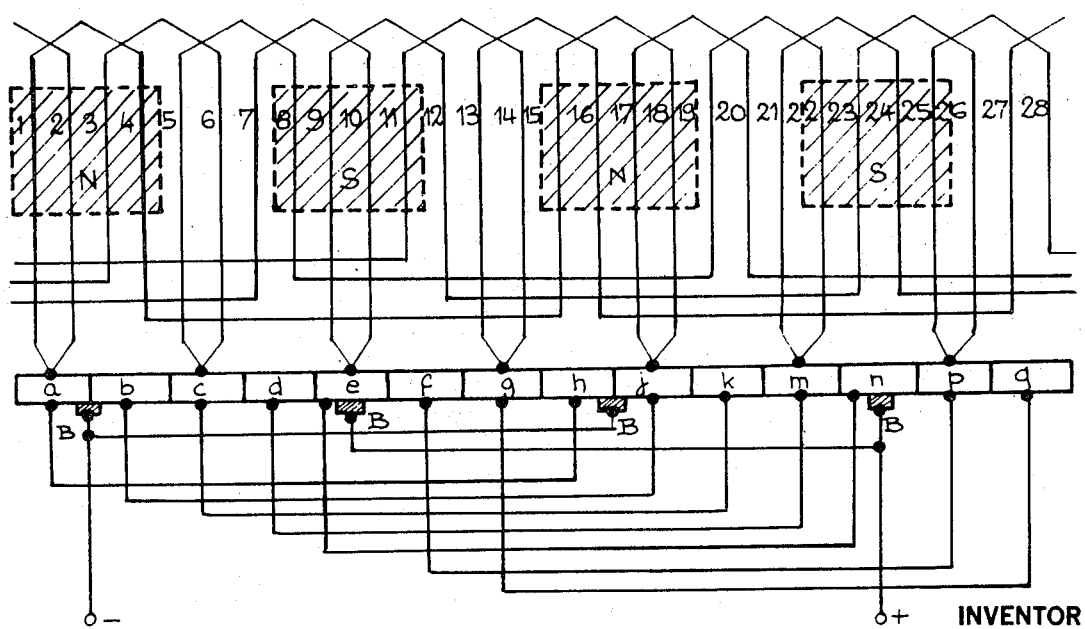

The motor the developed diagram of which is shown in FIG. 3 also present two pairs of inductor field poles and it has seven pairs of armature winding coils associated to fourteen commutator blades. The first pair of coils 1-4 and 15-18 connects the commutator blades $a$ and $j$; the second pair of coils 5-8 and 19-22 connects the commutator blades $c$ and $n$; the third pair of coils 9-12 and 23-26 connects the commutator blades $e$ and $p$; the fourth pair of coils 13-16 and 27-2 connects the commutator blades $j$ and $c$; the sixth pair of coils 21-24 and 7-10 connects the commutator blades $n$ and $e$; the seventh pair of coils 25-28 and 11-14 connects the blades $p$ and $g$. In this example of embodiment, the coils partially overlap and the span of each coil with respect to the inductor poles only is about one-third of the span between the axes of said inductor poles. As in the previous example, only two pairs of brushes B are shown on the commutator blades the internal connections of which are made similar to those shown and disclosed for the embodiment of FIG. 2.

The above examples consider the case where $p = 2$, and consequently $n$ cannot be equal to 4, 6, 8, . . . Embodiments wherein $p = 3$ are directly deducible from the above and in such a case, $n$ could have been equal to 4, 5, 7, . . . but not equal to 6, 9, . . . Further machines where $p = 4$ are also directly deducible, with $n$ equal to 5, 6, 7, . . . but not equal to 8, 12, . . . The advantage sought from the provision of partially overlapping winding coils in the armature will be hereinlater explicitated.

The invention may be embodied as well in electromagnetic motors having a cylindrical airgap as in electromagnetic motors having a planar and annular airgap. The invention may further be embodied as well with insulated thin wire winding coils as with printed circuit winding coils for the armature.

FIG. 4 shows an illustrative embodiment of a cylindrical airgap motor having four inductor field poles and designed in accordance with FIG. 1. The field structure comprises a magnetic yoke 30 presenting four pole pieces of alternate North and South polarities. Said poles may be wound poles, their polar lugs being integral with the cylindrical yoke. They may preferably be permanent magnet poles, the inductor structure being made of orientated ferrite members the spanning angle of which may reach 68 geometrical degrees, i.e., 136 electrical degrees. Instead of four active members two only can be used the two other ones being mere soft iron lugs facing the two first ferrite ones.

The rotor, which rotates around a shaft (not shown) comprises six polar lugs, from 60 to 65, moulded for instance together with a central core. On each polar lug is located an electro-magnet coil, from 50 to 55. Said coils are connected to the blades of a commutator C in the fashion disclosed on the drawing, i.e., according to the circuit relations detailed in FIG. 1, the diametrically opposite blades being electrically interconnected. The body of the rotor could be made of an insulating material loaded with a magnetic powder, as known.

FIGS. 5 to 7 show a disc-shaped embodiment of the same basic arrangement as the cylindrical one of FIG. 4. FIG. 5 is a view of that face of the armature which carries the commutator C. FIG. 6 is a view of the airgap face of the field structure and FIG. 7 is a cross-section view of the motor, shaft thereof not shown. The armature comprises three pairs of winding coils, from 61 to 66, housed in a moulded carrier thin disc 40, wherein they may be sticked for instance with the aid of two unshown adhesive washers if required. The carrier 40 may be made of a magnetic insulating material such for instance as a hard ferrite or a magnetic powder loaded dielectric in order to increase the useful flux in the airgap. The inductor member may be made with salient permanent magnet poles or, as shown in FIG. 7, of a ferrite ring wherein permanent magnet poles had been imprinted in a known fashion. A soft iron plate 21 is shown for a better closure of the magnetic flux through the airgap. To said plate may be substituted another pole bearing ferrite ring, the polarities of the facing poles being reversed from one side to the other side of the airgap.

Figure 8:
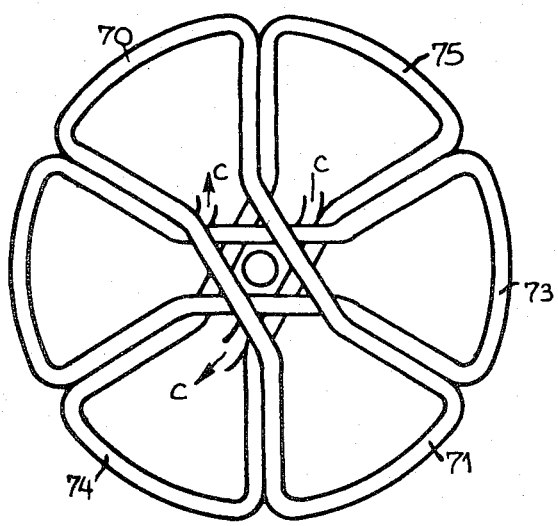
FIGS. 8 and 9, to be considered together, show another embodiment of a planar airgap motor according to the invention; and, FIG. 10 shows a further possible embodiment of a planar airgap motor according to the invention.
Figure 9:
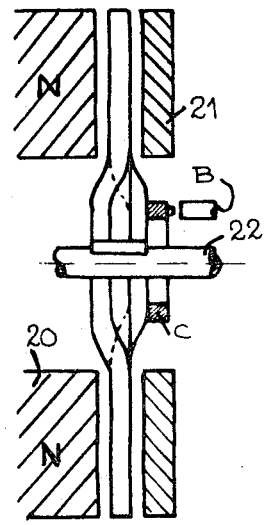

FIGS. 8 and 9 show a disc-member electromagnetic motor of the same kind as that of FIGS. 5 to 7, but in the embodiment shown in FIGS. 8 and 9, each pair of winding coils of the armature is made of a single winding coil diametrically extending through the disc-shaped member and having its end portions shaped according to the required polar areas. The central portions of such diametral winding coils are superimposed when preformed coils are assembled, hence the armature presents an increased thickness in its central portion as shown in FIG. 9. No separate carrier disc is useful when such diametral coils are molded under pressure within a thermosetting resin material. The shaft 22 may, if desired, be a part of said moulded unit and the commutator C may be applied over the central part of the unit with its blades connected to ends of the coil wires protruding from the unit for the said coils 70–71, 72–73 and 74–75.

Figure 10:
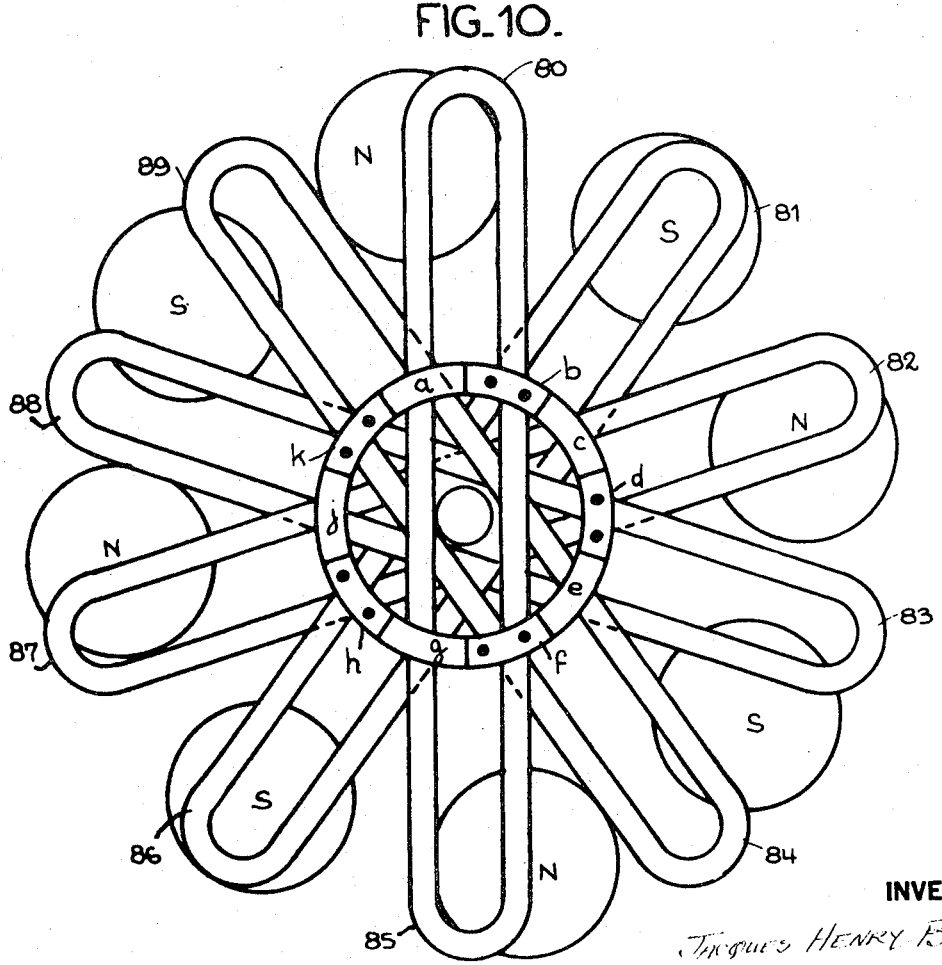

FIG. 10 illustratively shows an embodiment wherein $p = 4$ and $n = 5$, derived from the example of FIGS. 8 and 9. The more the number of poles is increased, the lesser the utility of shaping the ends of the pairs of winding coils. Five pairs of coils are provided, 80–85, 81–86, 82–87, 83–88 and 84–89, each pair consisting of a diametrally extending single winding coil, and there are provided ten commutator blades, $a, b, c, d, e, f, g, h, j, k$. The blades $a$ and $f$, $b$ and $g$, $c$ and $h$, $d$ and $j$, $e$ and $k$ are respectively interconnected. Coils 80 and 81 are connected to blade $b$, coils 82 and 83 to blade $d$, coils 84 and 85 to blade $f$, coils 86 and 87 to blade $h$ and coils 88 and 89 to blade $k$.

The armature winding coils may be made of thin enameled electric wire, each coil then being a multilayer wound one. They may as well be made of a thicker insulated electric wire which is arranged in concentric and juxtaposed flat turns. After a temporary securing by means of a thermo-adhesive glue for instance, the coils and the commutator are molded within an appropriate thermo-setting rosin. Instead of using insulated electric wire, one may have recourse to printed circuit spirals over a thin carrier for each coil, preferably on the two faces of said carrier; the coils are thereafter laminated together, their central portions constituting a conventional multi-layer member with a radial blade commutator in the assembly.

The intrinsic operation of machines according to the invention is conventionally obvious. With respect to the two-pole machines of the prior art, the induced electro-motive force is, for a same number of turns per coil in the armature, multiplied by a factor $p$. Also the efficiency is improved as the Joule losses are reduced from the reduction to about 90 electrical degrees of the polar arcs as well in the rotor as in the stator (which further increases the available area and volume for placing the copper of the armature coils). Further, the torque modulation frequency, and consequently the electro-motive force modulation frequency, is multiplied by a coefficient equal to $p$. This simplifies the filter circuits when the machine is used as a generator, which is obviously possible, in addition to its normal use as a motor. Such a modulation is reduced in reverse proportion to the number of coils per two poles of the machine. By further appropriately choosing the overlap degree of the coils in the armature, one may in any case minimize the harmonies of the fundamental attraction/repulsion waveform or, on the other hand and when needed, favorize the generation of harmonics for increasing the electro-motive force and the "average" torque generated in operation of the machines.

The invention further leads to certain special advantages concerning the manufacture of the armatures:

when the armature coils do not overlap, the average length of the turns is reduced and the assembly of the rotor is inherently facilitated;

in disc-shaped embodiments, the flat coils may be made of sectoral coapting shapes, which facilitate their molding in a plastic material support; and, when $p$ is an even number, the pairs of diametrically opposite coils are of identical magnetic polarity and consequently such pairs of coils may be wound or otherwise established as a single winding coil as it has been hereinabove described.

What is claimed is:

1. Electromagnetic attraction-repulsion operated rotating machine comprising in combination:

$2p$ inductor field poles, each pole spanning over substantially 90 electrical degrees on one face of a magnetic air gap, where $p$ is an integer higher than unity;

an armature having $2n$ winding coils distributed thereon, each coil spanning over substantially 90 electrical degrees, where $n$ is an integer higher than but not a multiple of $p$; and a commutator having $2n$ blades, each blade of which is electrically connected to the diametrically opposite blade and every other one of said blades being electrically connected to respective ends of two diametrically opposite ones of said winding coils.

2. Electromagnetic rotating machine according to claim 1, wherein, the overall structure of said machine being of planar annular airgap, the armature winding coils are housed within a disc-shaped carrier which further carries the commutator blades.

3. Electromagnetic rotating machine according to claim 1, wherein, the overall structure of said machine being of planar annular airgap, the armature winding coils are made by a two-face print of the conductors thereof on a carrier disc.

4. Electromagnetic rotating machine according to claim 1, wherein, the overall structure of said machine being of planar annular airgap, the pairs of diametrically opposed winding coils together constitute a single electrical uninterrupted electrical circuit the turns of which alternately pass from one of the coil to the other one of the pair, and wherein the armature consists of the superposition of such pairs of winding coils, mutually overlying at least in their central portions externally to the magnetic airgap of the machine.

5. Electromagnetic rotating machine according to claim 4, wherein the said pairs of winding coils consist of printed-circuit conductors over thin dielectric sheets and the armature consists of an adhesive lamination of such sheets.

6. Electromagnetic rotating machine according to claim 4, wherein said pairs of winding coils consist of flat unitary coils of insulated electric wire and the armature consists of a laminate of such superimposed coils moulded within a set insulating rosin material.

7. Electromagnetic rotating machine according to claim 4, wherein the commutator consists of flat blades straightforwardly applied over and secured to one face of the central portion of the armature external to the magnetic airgap thereof.

8. Electromagnetic rotating machine according to claim 1, wherein the said pairs of armature winding coils partially overlap in their succession around the armature.

* * * * *